Dec. 5, 1939.   C. L. HAGAN   2,182,379
MEAT PREPARING INSTRUMENT
Filed Feb. 25, 1938
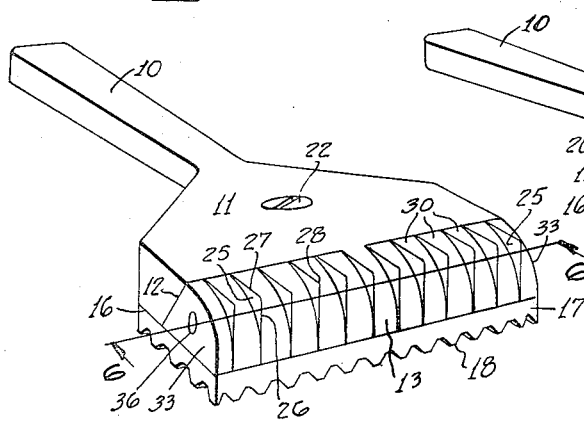
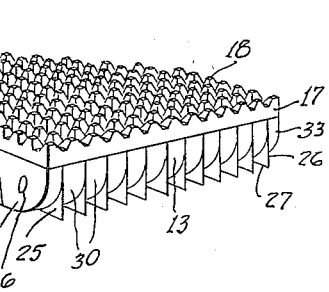
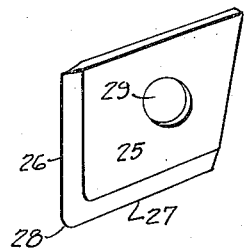
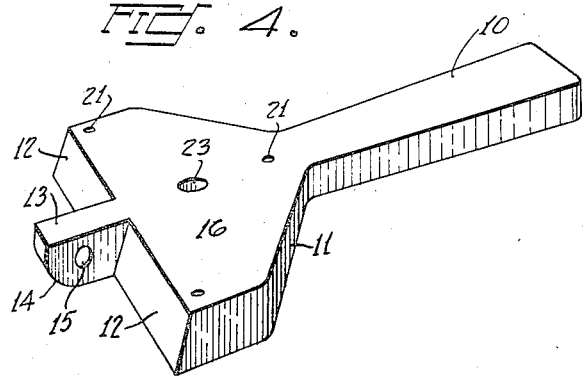
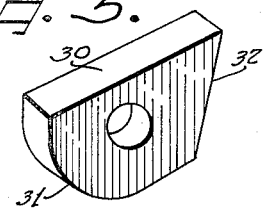
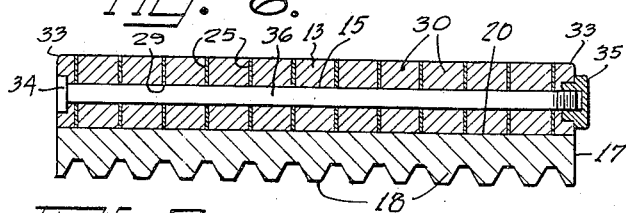
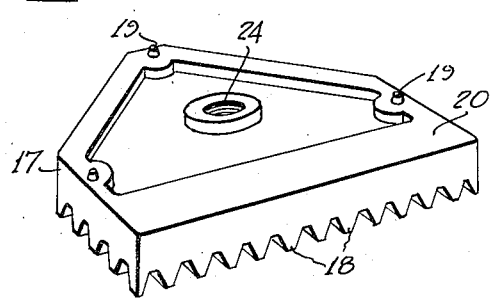
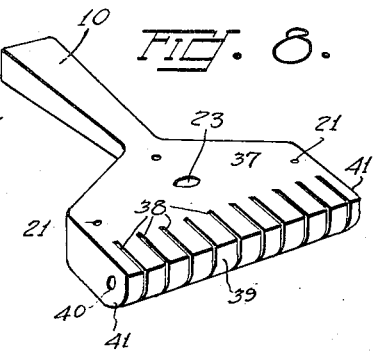
INVENTOR
CARL L. HAGAN
ATTORNEY Patented Dec. 5, 1939

2,182,379

UNITED STATES PATENT OFFICE 2,182,379

MEAT PREPARING INSTRUMENT

Carl L. Hagan, Portland, Oreg.

Application February 25, 1938, Serial No. 192,542

1 Claim. (Cl. 30—304)

This invention relates generally to the meat cutters art, and particularly to devices for preparing meat for cube steaks.

The main object of this invention is the construction of an exceedingly simple and efficient form of cutter whereby a steak may be easily and correctly cubed, and if necessary, rendered to a substantially uniform thickness prior to the cubing of same.

The second object is the construction of an instrument for the purpose stated which will be easy to manufacture and assemble and the parts thereof easily accessible for cleansing and replacement.

The third object is the combination of a levelling instrument and a cutting instrument whereby a steak may be correctly reduced to a desirable uniformity of thickness preparatory to the cubing of same.

I accomplish these and other objects in the manner set forth in the following specification as illustrated in the accompanying drawing, in which:

Fig. 1 is a perspective view of the device from the cubing side thereof.

Fig. 2 is a perspective view of the device from the levelling side thereof.

Fig. 3 is a perspective view showing one of the cutters.

Fig. 4 is a perspective view of the handle and cutter holder.

Fig. 5 is a perspective view of the spacers.

Fig. 6 is a section taken along the line 6—6 in Fig. 1.

Fig. 7 is a perspective view of the levelling or pounding element.

Fig. 8 is a perspective view showing a modified form of cutter holder.

Similar numerals refer to similar parts throughout the several views.

Referring in detail to the drawing, there is shown a handle 10 which forms a part of a cutter holding body 11 whose edge 12 is undercut and has projecting therefrom a central shank 13 having one rounded edge 14 and having a hole 15 formed laterally therethrough.

Associated with the body 11 and secured to its face 16 is the pounding element 17, on one side of which are formed the projections 18. Dowel pins 19 project from the side 20 into the holes 21 in the body 11. A screw 22 extends through the hole 23 in the body 11 into the tapped hole 24 in the pounding element 17.

The cutting elements 25 are of the wafer type and have two cutting edges 26 and 27 which meet at the rounded corner 28. Holes 29 are formed through the cutting elements 25 and register with the hole 15 in the shank 13. Between each adjacent pair of cutting elements 25 is placed a spacer 30 whose edge 31 conforms with the edge 14 of the element 13 and whose side 32 conforms with the edge 12 of the body 11. Against the outermost cutting elements 25 are placed the end clamps 33 which are counter-bored to receive the head 34 and the nut 35 of the bolt 36 which extends through all of the cutting elements 25, the spacers 30 and the end clamps 33.

It can be seen that by this construction the parts are securely held together and subject to easy operation and cleansing and replacement purposes.

In the form of the device shown in Fig. 8, the body 37 is provided with slots 38 adapted to receive the cutting elements 25 in which case the spacing elements 39 are integral with the body 37 and the hole 40 extends through the spacing elements 39 and the end clamps 41 and the spring of the parts is sufficient to permit a clamping action.

The operation of the device is as follows:

If it is desired to cube a steak, it may either be first pounded by means of the roughened surface of the device and after it has been reduced to an even thickness and also rendered more tender by the pounding action, it is cut into cubes by simply drawing the projecting cutting edges through the meat in lines which normally intersect each other.

While the two forms of the device are identical in functioning, the type employing the removable inserts possesses the advantage of making it possible to vary the spacing of the cutting elements 25.

I claim:

A meat cutter instrument consisting of a flat handled body member having a beveled edge opposite its handle and normal thereto and having a tongue projecting from said beveled edge, alternate cutting blades and spacers disposed on each side of said tongue, said spacers and blades being of a width equal to the body member, a bolt passing through all of said spacers, blades and tongue member and a plate secured against one flat side of said body member forming a stop for said blades.

CARL L. HAGAN.